E. THOMAS.
NUT LOCK.
APPLICATION FILED AUG. 6, 1912.
1,116,760.
Patented Nov. 10, 1914.
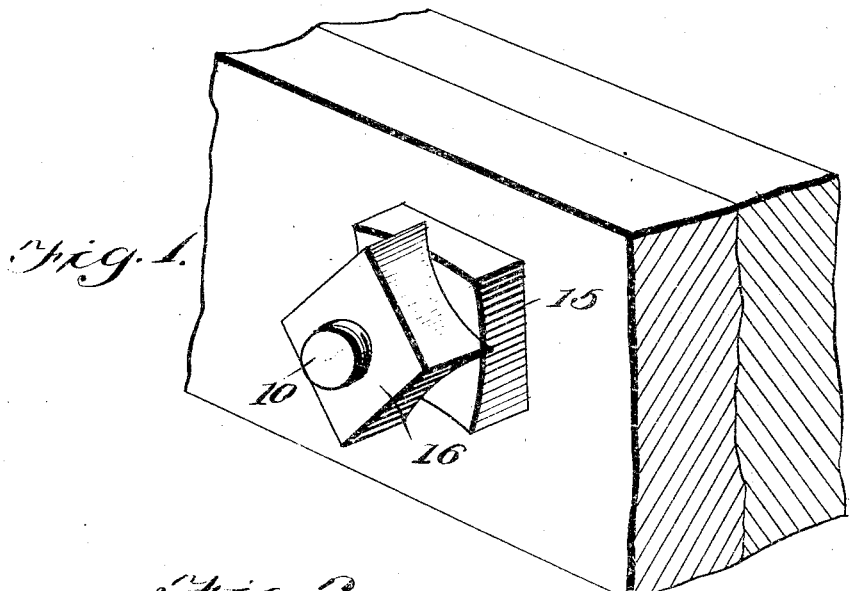
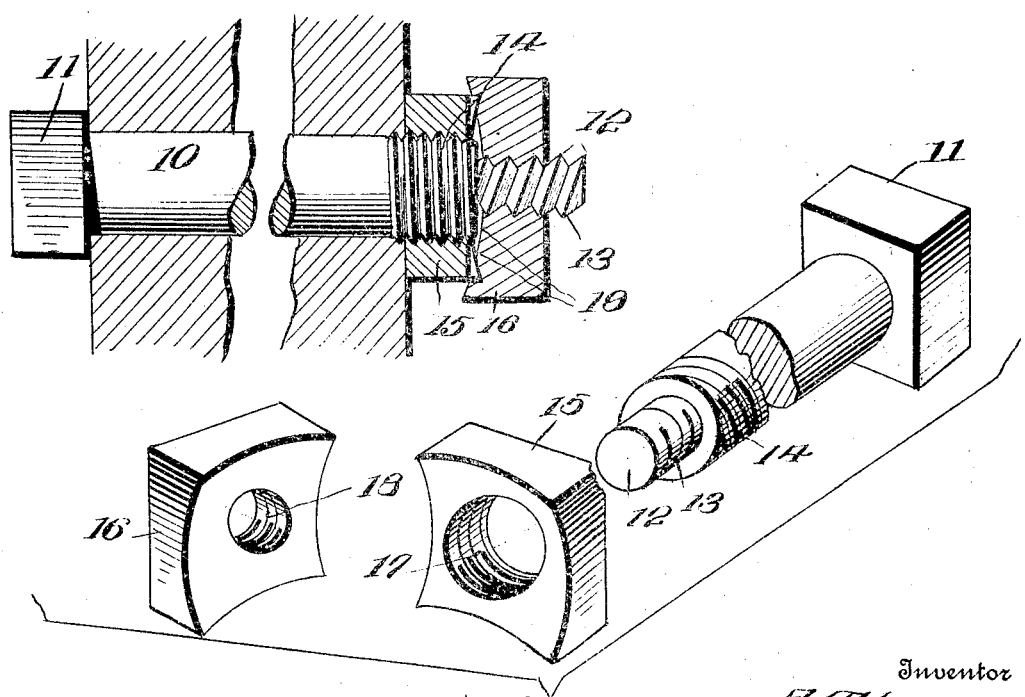
Witnesses
Inventor
E. Thomas.
By
Attorneys.

UNITED STATES PATENT OFFICE.

EDWARD THOMAS, OF ALTON, ILLINOIS.

NUT-LOCK.

1,116,760.  Specification of Letters Patent.  Patented Nov. 10, 1914.

Application filed August 6, 1912. Serial No. 713,633.

*To all whom it may concern:*

Be it known that I, EDWARD THOMAS, citizen of the United States, residing at Alton, in the county of Madison and State of Illinois, have invented certain new and useful Improvements in Nut-Locks, of which the following is a specification.

My invention relates to new and useful improvements in nut locks, and the object of my invention is to provide a nut lock embodying a pair of co-acting nuts, one of which is provided with a right-handed thread while the other is provided with a left-handed thread, both nuts being mounted upon the same bolt.

A further object of my invention is to so form the co-acting faces of the nuts that the turning of the outer nut will cause it to lock with the inner nut and also prevent the turning of either nut in either direction.

A still further object of my invention is to provide a novel form of bolt for use with the above described nuts including a shank portion provided with a screw-thread either right or left-handed and having a reduced terminal provided with an oppositely formed thread, the pitch of the said latter thread being greater than that of the former.

With these and other objects in view, my invention will be more fully described, illustrated in the accompanying drawing and then specifically pointed out in the claim which is attached to and forms a part of this application.

Figure 1 is a fragmentary perspective of my improved lock nut in use. Fig. 2 is a central longitudinal sectional view of the same. Fig. 3 is a detail perspective of the bolt and co-acting nuts, the nuts being removed from the bolt to more clearly show their construction.

Corresponding and like parts are referred to in the following description and indicated in all the views of the accompanying drawing by the same reference characters.

The preferred embodiment of my invention includes a bolt 10, provided at one end with a head 11 of any suitable form and having its opposite end reduced, as shown at 12. This reduced end is provided with either a right or left-handed screw-thread 13 and that portion of the bolt shank adjacent the reduced end is provided with an oppositely formed screw-thread 14. The pitch of the thread 12 is preferably greater than that of the thread 14, as shown in Fig. 2. Co-acting with this bolt, is a pair of nuts 15 and 16 which are identical in size and shape and the former of which is provided with a threaded bore 17 for engagement with the threaded portion 14 of the bolt, while the latter is provided with a threaded bore 18 which engages with the portion 13 of the bolt.

One face of each of the nuts 15 and 16 is dished as shown at 19 in Fig. 3. That is, the face is concaved both longitudinally and transversely. In applying the nuts to the bolt, the nut 15 is turned into place upon the threaded portion 14 of the bolt with its dished face directed outwardly. The nut 16 is then threaded upon the reduced portion 12 of the bolt with its dished face directed inwardly until it engages with the nut 15.

As will be apparent from Figs. 1 and 2 of the drawing, the corner portions of the nuts are thicker than the central portions and when the nuts are to be locked in place the outer nut is turned to force its corner portions past the adjacent corner portions of the nut 15. Considerable force is required to accomplish this and it will, therefore, be impossible for the nuts to work back out of this engagement.

As the nuts are reversely threaded, any tendency upon the part of one to turn in either direction is counteracted by the other, the two being locked together and one being adapted for movement in one direction, while the other is adapted for movement in the opposite direction.

With the outer threads, that is the threads upon the reduced portion of the bolt, of greater pitch than the inner threads or threads upon the unreduced portion, the two threads being reversely formed, the outer nut may be readily removed by simultaneously turning both nuts in a direction to tighten the inner nut in order to move the nuts away from each other and permit disengagement of their interlocking corners. This simultaneous turning of both nuts in the same direction, causes them to move away from each other through a distance equal to a fractional part of the pitch of both threads. At the same time, because of the relative fineness of the inner threaded shank, the inner nut is not appreciably tightened during such turning of the nuts. After the nuts have thus been separated, the outer nut is separately turned and so removed from the shank of the nut, after which the inner nut is removed.

From the foregoing description it will be apparent that I have provided an extremely simple and efficient form of lock nut and one which may be employed for all kinds of work as it does not require the forming of any sockets in the bodies being bolted together, or the attachment of any auxiliary locking plates or springs.

Having thus described the invention what is claimed as new is:—

A nut lock including a bolt provided with a reduced terminal having screw threads, the shank of the bolt being reversely threaded, the thread of the reduced portion being of greater pitch than the thread of the shank portion, a nut threaded to engage with the threaded portion of the shank, and a second nut equal in size and shape to the first threaded to engage with the reduced portion of the shank, the opposed faces of the nuts being dished to provide extending corners for interlocking engagement.

In testimony whereof I affix my signature in presence of two witnesses.

EDWARD THOMAS. [L. S.]

Witnesses:
R. M. NATHAN,
MARY THOMAS.